(12) United States Patent
Han et al.

(10) Patent No.: US 9,274,684 B2
(45) Date of Patent: Mar. 1, 2016

(54) HIERARCHICAL NAVIGATION WITH RELATED OBJECTS

(71) Applicants: James Han, Long Grove, IL (US); Andreas Hersche, Island Lake, IL (US)

(72) Inventors: James Han, Long Grove, IL (US); Andreas Hersche, Island Lake, IL (US)

(73) Assignee: Siemens Industry, Inc., Alpharetta, GA (US)

(*) Notice: Subject to any disclaimer, the term of this patent is extended or adjusted under 35 U.S.C. 154(b) by 169 days.

(21) Appl. No.: 13/788,384

(22) Filed: Mar. 7, 2013

(65) Prior Publication Data

US 2014/0258940 A1 Sep. 11, 2014

(51) Int. Cl.
G06F 3/0484 (2013.01)
G06F 3/0482 (2013.01)
G06F 9/44 (2006.01)
G05B 15/02 (2006.01)
G05B 23/02 (2006.01)

(52) U.S. Cl.
CPC .............. *G06F 3/0484* (2013.01); *G05B 15/02* (2013.01); *G05B 23/0267* (2013.01); *G06F 3/0482* (2013.01); *G06F 3/04847* (2013.01); *G06F 9/4443* (2013.01); *G05B 2219/23136* (2013.01); *G05B 2219/23178* (2013.01); *G05B 2219/24091* (2013.01); *G05B 2219/2642* (2013.01)

(58) Field of Classification Search
CPC .. G06F 3/0482; G01C 21/36; H04N 21/4131; F24F 11/0086
USPC .......... 715/740, 744, 771, 839, 853–855, 970
See application file for complete search history.

(56) References Cited

U.S. PATENT DOCUMENTS

| | | | |
|---|---|---|---|
| 7,031,880 B1* | 4/2006 | Seem ................ | G05B 23/0232 700/174 |
| 7,454,706 B1* | 11/2008 | Matthews et al. ............. | 715/713 |
| 7,831,930 B2* | 11/2010 | Dresti et al. .................. | 715/835 |
| 2001/0030667 A1* | 10/2001 | Kelts .............................. | 345/854 |
| 2006/0058900 A1* | 3/2006 | Johanson et al. .............. | 700/83 |
| 2008/0215240 A1* | 9/2008 | Howard et al. ............... | 701/213 |
| 2009/0140058 A1* | 6/2009 | Koster et al. ................ | 236/49.3 |
| 2009/0143916 A1* | 6/2009 | Boll et al. ..................... | 700/276 |
| 2010/0251150 A1 | 9/2010 | Walter et al. | |
| 2010/0251184 A1* | 9/2010 | Majewski et al. ............. | 715/841 |
| 2011/0087988 A1* | 4/2011 | Ray ....................... | G06Q 50/16 715/771 |
| 2012/0130547 A1* | 5/2012 | Fadell et al. .................. | 700/276 |
| 2012/0291068 A1* | 11/2012 | Khushoo et al. .............. | 725/38 |

FOREIGN PATENT DOCUMENTS

EP 1475701 A2 11/2004
EP 1965301 A1 9/2008

OTHER PUBLICATIONS

EP Search Report dated May 16, 2014, for EP Application No. 14158202.3-1954. (8 pages).

* cited by examiner

*Primary Examiner* — Andrew Tank

(57) ABSTRACT

A method for navigating information includes identifying a value for a property of a first object associated with one or more devices managed by a management system. The method includes displaying a first plurality of tiles for a plurality of objects, including the first object. A first of the tiles is associated with the first object and includes a display of a graphic associated with the object and the identified value for the property. The method includes identifying a plurality of related objects that are related to the first object and displaying a second plurality of tiles for the related objects in response to receiving a selection of the first tile for the first object. Additionally, the method includes displaying, in response to receiving a selection of a second tile in the second plurality of tiles for one of the related objects, information about the one related object.

17 Claims, 13 Drawing Sheets

FIG. 8

⊕ Active Events Supply Temperature

SIEMENS

Active Events

Run at: 7/25/2012 2:31:49 PM

Purpose: Report of active events
Location: ***
Condition Filter:

| Category | Cause | State | Object Designation | Object Description | Discipline | Subdiscipline | Creation Date Time |
|---|---|---|---|---|---|---|---|
| Trouble | HDB Scheduler (Not Running) | Unprocessed | System1.Managemen tView.ManagementVi ew.ManagementSyste m.Servers.Server2.Hist oryDatabase | History Database | Management System | Unassigned | 6/25/2012 10:03:33 PM |
| Status | BACnet Driver Info | Ready to be closed | System1.Managemen tView.ManagementVi ew.FieldNetworks.BA CnetNetwork_1.Hard ware.JamesDevice | Simulator Device 6687 | Buiding Automation | Unassigned | 7/23/2012 8:57:08 AM |
| Status | Device Failure | Ready to be closed | System1.Managemen tView.ManagementVi ew.FieldNetworks.BA CnetNetwork_1.Hard ware.JamesDevice | Simulator Device 6687 | Buiding Automation | Unassigned | 7/10/2012 3:59:33 PM |
| Status | Device Return | Ready to be closed | System1.Managemen tView.ManagementVi ew.FieldNetworks.BA CnetNetwork_1.Hard | Simulator Device 6687 | Buiding Automation | Unassigned | 7/10/2012 1:35:17 PM |

800

HIERARCHICAL NAVIGATION WITH RELATED OBJECTS

TECHNICAL FIELD

The present disclosure is directed, in general, to management systems and, more particularly, to navigating displayed information associated with a management system.

BACKGROUND OF THE DISCLOSURE

Building automation and management systems encompass a wide variety of systems that aid in the monitoring and control of various aspects of building operation. Building automation systems include security systems, fire safety systems, lighting systems, and HVAC systems. The elements of a building automation system are widely dispersed throughout a facility. For example, an HVAC system may include temperature sensors and ventilation damper controls, as well as other elements that are located in virtually every area of a facility. Similarly, a security system may have intrusion detection, motion sensors, and alarm actuators dispersed throughout an entire building or campus. Fire safety systems also include widely dispersed devices in the form of smoke alarms, pull stations, and controllers. These building automation systems typically have one or more centralized control stations from which system data may be monitored and various aspects of system operation may be controlled and/or monitored.

Building automation systems may include vast numbers of devices and control points that may be communicated with, monitored, and controlled. Historically, building management systems used to display and access data for monitoring and controlling operations of the building automation system have been relatively rigid in their user interface architecture.

There is a need, therefore, for an interface that allows for information to be navigated in an intuitive and a timely manner.

SUMMARY OF THE DISCLOSURE

Various disclosed embodiments relate to systems and methods for navigating information associated with a management system.

Various embodiments include management systems, methods, and mediums. A method includes identifying a value for a property of an object associated with one or more devices managed by a management system. The method includes identifying a value for a property of a first object associated with one or more devices managed by a management system. The method includes displaying a first plurality of tiles for a plurality of objects, the plurality of objects including the first object, a first tile in the first plurality of tiles being for the first object, the first tile including a display of a graphic associated with the first object and the identified value for the property. The method includes identifying a plurality of related objects that are related to the first object and displaying a second plurality of tiles for the related objects in response to receiving a selection of the first tile for the first object. Additionally, the method includes displaying, in response to receiving a selection of a second tile in the second plurality of tiles for one of the related objects, information about the one related.

The foregoing has outlined rather broadly the features and technical advantages of the present disclosure so that those skilled in the art may better understand the detailed description that follows. Additional features and advantages of the disclosure will be described hereinafter that form the subject of the claims. Those of ordinary skill in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which:

FIG. 8 illustrates an exemplary screen capture of the graphical user interface displaying a report for data associated with an object selected using the navigation application in accordance with disclosed embodiments;

DETAILED DESCRIPTION

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

Embodiments of the present disclosure provide an intuitive display and system of navigating information for a management system. Embodiments of the present disclosure provide a hierarchal structure for the organization of related objects and associated data. The hierarchal structure of the present disclosure allows users to easily monitor and manage aspects of building automation and management.

Figure 1:
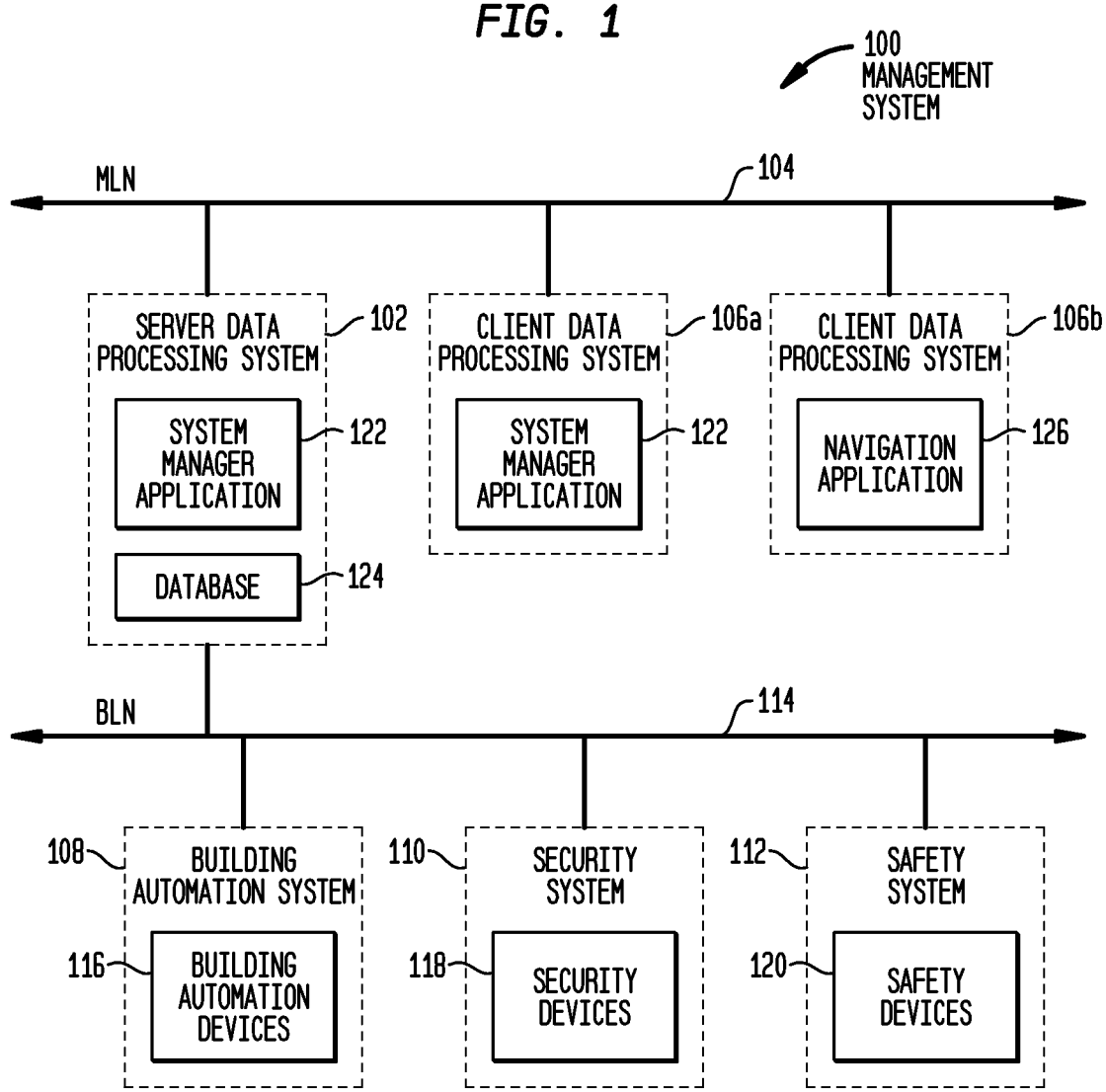
FIG. 1 illustrates a block diagram of a management system in which various embodiments of the present disclosure are implemented.

FIG. 1 illustrates a block diagram of management system 100 in which various embodiments of the present disclosure are implemented. In this illustrative embodiment, the management system 100 includes a server data processing system 102 connected, via a management level network (MLN) 104 to client data processing systems 106. The MLN 104 is a medium used to provide communication links between various data processing systems and other devices in the management system 100. MLN 104 may include any number of suitable connections, such as wired, wireless, or fiber optic links. MLN 104 may be implemented as a number of different types of networks, such as, for example, the internet, a local area network (LAN), or a wide area network (WAN). In some embodiments, elements of the management system 100 may be implemented in a cloud computing environment. For example, MLN 104 may include or be connected to one or more routers, gateways, switches, and/or data processing systems that are remotely located in a cloud computing environment.

In this illustrative embodiment, server data processing system 102 is operably connected to building automation system (BAS) 108, security system 110, and safety system 112 via building level network (BLN) 114. The BAS 108 is an environmental control system that controls at least one of a plurality of environmental parameters within a building or buildings, such as, for example, temperature, humidity, and/or lighting. The security system 110 controls elements of security within a building or buildings, such as, for example, location access, monitoring, and intrusion detection. The safety system 112 controls elements of safety within a building or buildings, such as, for example, smoke, fire, and/or toxic gas detection.

As depicted, the BAS 108 includes building automation devices 116, the security system 110 includes security devices 118, and the safety system 112 includes safety devices 120. In some embodiments, the BAS 108 may encompass the security devices 118 and safety devices 120. The devices 116-120 may be located inside or in proximity to one or more buildings managed using management system 100. The devices 116-120 are configured to provide, monitor, and/or control functions of the BAS 108, the security system 110, and/or the safety system 112 within one or more buildings managed using the management system 100. For example, without limitation, the devices 116-120 may include one or more field panels, field controllers, and/or field devices inside or in proximity to one or more buildings. More specifically, devices 116-120 may include one or more general-purpose data processing systems, programmable controllers, routers, switches, sensors, actuators, cameras, lights, digital thermostats, temperature sensors, fans, damper actuators, heaters, chillers, HVAC devices, detectors, motion sensors, glass-break sensors, security alarms, door/window sensors, smoke alarms, fire alarms, gas detectors, etc. The devices 116-120 may use the BLN 114 to exchange information with other components connected to the BLN 114, such as, for example, components within the BAS 108, the security system 110, the safety system 112, and/or the server data processing system 102. One or more of the devices 116-120 may also be connected via one or more field level networks (FLN) to a field panel or field controller for monitoring and controlling the respective field devices within a room, floor, or other space of a building. For example, devices in the devices 116-120 may send and receive information to and from other devices in the devices 116-120 using one or more FLNs present in management system 100.

The management system 100 allows for systems and devices located throughout one or more buildings to be managed, monitored, and controlled from a single point and in a uniform manner. For example, a system manager application 122 may be installed on one or more workstations, such as server data processing system 102, client data processing system 106a, and/or other devices connected via MLN 104. The system manager application 122 is a collection of software and associated data files that provides a user-modifiable and intuitive graphical user interface for allowing a user to monitor, review, and control various points and devices in the management system 100. The system manager application 122 may include, for example, without limitation, executable files, user-layout-definition files, graphics control modules, an infrastructure interface, and/or a number of software extensions.

In various embodiments of the present disclosure, a navigation application 126 may be installed on one or more workstations, such as client data processing system 106b and/or other devices connected via MLN 104. The navigation application 126 is a collection of software and associated data files that provides an intuitive graphical user interface for allowing a user to navigate through related objects and data to monitor, review, and control various points and devices in the management system 100. In some embodiments, the navigation application 126 provides functionality similar to that provided by the system manager application 122 using the hierarchal navigation techniques described herein. For example, the navigation application 126 may be designed to provide a user of a mobile device, such as a tablet or smartphone, with the functionality of the system manager application 122 and includes navigation abilities specially designed to accommodate hardware differences that may be present in a mobile device.

The server data processing system 102 includes a database that stores information about the devices 116-120 within the management system 100. A database 124 includes one or more data models of data points, devices, and other objects in the management system 100. For example, the database 124 may store values for devices in the BAS 108 (e.g., temperature, alarm status, humidity). These values may be referred to as a point or data point. As referenced herein, a "point" or "data point" may be (i) any physical input or output to or from a respective controller, field device, sensor, or actuator; or (ii) any virtual point associated with a control application or logic object within a field controller or field panel of the systems 108-112 that is measured, monitored, or controlled. The database 124 may also store static information, such as model numbers, device types, and/or building and room-installation location information about devices in the management system 100. The database 124 may also store graphical models of one or more buildings managed by the management system 100. For example, the graphical models may include layouts and schematics of one or more rooms, floors, and buildings managed by the management system 100.

In these illustrative embodiments, objects in the management system 100 include anything that creates, processes, or stores information regarding data points, such as physical devices (BAS controllers, field panels, sensors, actuators, cameras, etc.), and maintains data files, such as control schedules, trend reports, calendars, and the like.

The system manager application 122 and/or the navigation application 126 may further include software extensions or services that provide operations of the management system 100. For example, the software extensions may include a print manager, a reporting subsystem, and a status propagation manager. For example, a reporting subsystem implemented on a workstation data processing system (e.g., server data processing system 102 or client data processing systems 106) is a system that manages the acquisition of data values from the database 124 for the generation of various reports. Such reports may include, for example, trends for a temperature of a room or the like. In another example, the status propagation manager implemented on a workstation data processing system (e.g., server data processing system 102 or client data processing systems 106) propagates alarm status information, among other things, to various other data objects in the system. An example of a suitable alarm propagation system is provided in U.S. patent application Ser. No. 12/566,891, filed Sep. 25, 2009, which is assigned to the assignee of the present application and is incorporated by reference herein.

In various embodiments, system manager application 122 and/or the navigation application 126 may, via server data processing system 102 and/or client data processing systems 106, implement scheduling functions of the management system 100. The scheduling function is used to control points in the various systems based on a time-based schedule. For example, the scheduling function may be used to command temperature set points based on the time of day and the day of the week within the building automation devices 116.

The server data processing system 102 is connected to the BLN 114 and includes one or more hardware and/or software interfaces for sending and receiving information to and from the devices 116-120 in the BAS 108, the security system 110, and/or the safety system 112. For example, the server data processing system 102 may request and receive data regarding a status of one or more devices in the devices 116-120. The system manager application 122 and/or the navigation application 126, via server data processing system 102 and/or client data processing systems 106, provide a user with the functionality to monitor real-time information about the status of one or more devices and objects in the management system 100. The system manager application 122 and/or the navigation application 126, via server data processing system 102 or client data processing systems 106, also provide a user with the functionality to issue commands to control one or more devices and objects in the management system 100. For example, one or more of the devices 116-120 may implement a network protocol for exchanging information within the management system, such as building automation and controls network (BACnet) or local operation network talk (LonTalk) protocols.

Additional descriptions and examples of the management system 100 and components that may be present within the management system 100 may be found in Patent Cooperation Treaty Application Serial No. PCT/US2011/054141, filed Sep. 30, 2011, entitled "MANAGEMENT SYSTEM WITH VERSATILE DISPLAY" and U.S. Provisional Patent Application Ser. No. 61/541,925, filed Sep. 30, 2011, entitled "MANAGEMENT SYSTEM USING FUNCTION ABSTRACTION FOR OUTPUT GENERATION". Both of these applications are hereby incorporated by reference as if fully set forth herein.

The illustration of the management system 100 in FIG. 1 is not meant to imply physical or architectural limitations to the manner in which different illustrative embodiments may be implemented. Other components in addition to and/or in place of the ones illustrated may be used. Some components may be unnecessary in some illustrative embodiments. For example, any number of data processing systems may be used as workstations in the management system 100, while functions of the system manager application 122 and/or the navigation application 126 may be implemented in different data processing systems in the management system 100. In other examples, embodiments of the management system 100 may not include one or more of the BAS 108, the security system 110, and/or the safety system 112.

Figure 2:
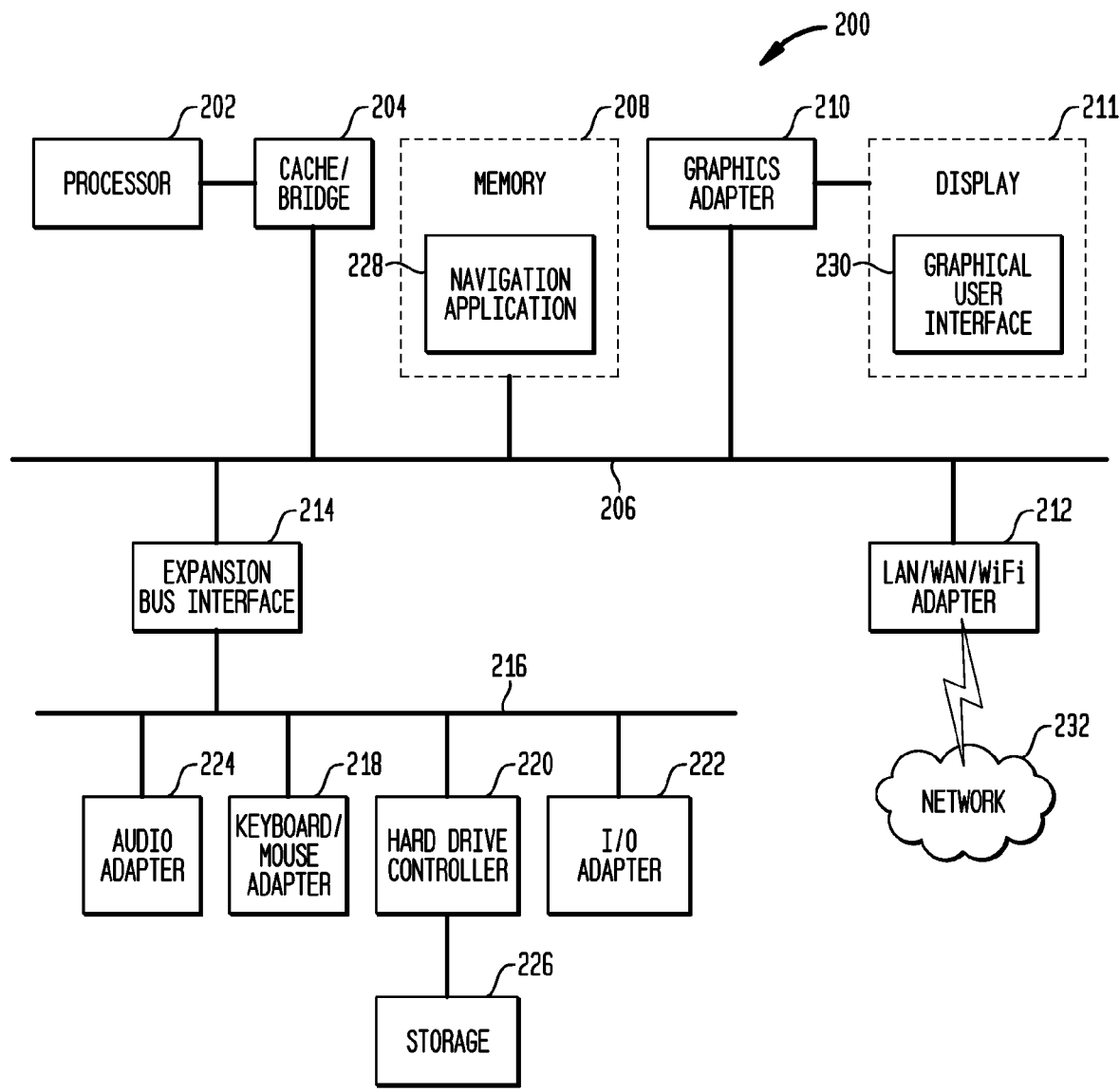
FIG. 2 illustrates a block diagram of a data processing system that may be employed in the management system for implementing various embodiments of the present disclosure.

FIG. 2 depicts a block diagram of a data processing system 200 in which various embodiments are implemented. The data processing system 200 is an example of one implementation of the server data processing system 102 in FIG. 1. The data processing system 200 is also an example of the client data processing systems 106.

The data processing system 200 includes a processor 202 connected to a level two cache/bridge 204, which is connected in turn to a local system bus 206. The local system bus 206 may be, for example, a peripheral component interconnect (PCI) architecture bus. Also connected to the local system bus 206 in the depicted example are a main memory 208 and a graphics adapter 210. The graphics adapter 210 may be connected to a display 211.

Other peripherals, such as a local area network (LAN)/Wide Area Network (WAN)/Wireless (e.g. WiFi) adapter 212, may also be connected to the local system bus 206. An expansion bus interface 214 connects the local system bus 206 to an input/output (I/O) bus 216. The I/O bus 216 is connected to a keyboard/mouse adapter 218, a hard drive controller 220, and an I/O adapter 222. The hard drive controller 220 may be connected to a storage 226, which may be any suitable machine-usable or machine-readable storage medium, including, but not limited to, nonvolatile, hard-coded type mediums, such as read only memories (ROMs) or erasable, electrically programmable read only memories (EEPROMs), magnetic tape storage, and user-recordable type mediums, such as floppy disks, hard disk drives and compact disk read only memories (CD-ROMs) or digital versatile disks (DVDs), solid state drives, flash memory, and other known optical, electrical, or magnetic storage devices.

Also connected to the I/O bus 216 in the example shown is an audio adapter 224, to which speakers (not shown) may be connected for playing sounds. The keyboard/mouse adapter 218 provides a connection for a pointing device (not shown), such as a mouse, trackball, trackpointer, etc. In some embodiments, the data processing system 200 may be implemented as a touch screen device, such as, for example, a tablet computer, a touch screen panel, or a smartphone. In these embodiments, elements of the keyboard/mouse adapter 218 may be implemented in connection with the display 211.

In various embodiments of the present disclosure, the data processing system 200 is implemented as a workstation with a navigation application 228 installed in the memory 208. The navigation application 228 is an example of one embodiment of navigation application 126 in FIG. 1. For example, the processor 202 executes program code of the navigation application 228 to generate graphical user interface 230 displayed on display 211. In various embodiments of the present disclosure, the graphical user interface 230 includes a display of tiles for objects representing devices inside or in proximity to one or more buildings managed by the management system 100. The graphical user interface 230 provides an interface for a user to view information and alerts for one or more devices, objects, and/or points within the management system 100. The graphical user interface 230 also provides an interface that is navigable using a hierarchical structure to present object properties, graphics, trends, schedules, and reports in an intuitive manner that is easy to navigate.

Those of ordinary skill in the art will appreciate that the hardware depicted in FIG. 2 may vary for particular implementations. For example, other peripheral devices, such as an optical disk drive and the like, also may be used in addition to or in place of the hardware depicted. The depicted example is provided for the purpose of explanation only and is not meant to imply architectural limitations with respect to the present disclosure.

One of various commercial operating systems, such as a version of Microsoft Windows™, a product of Microsoft Corporation located in Redmond, Wash. may be employed. The operating system may be modified or created in accordance with the present disclosure as described, for example, to implement navigation of information from a management system. In one exemplary embodiment, the navigation application 228 is implemented in connection with a Windows 8 operating system using a metro or modern UI typography-based design language.

LAN/WAN/Wi-Fi adapter 212 may be connected to a network 232, such as, for example, MLN 104 in FIG. 1. As further explained below, the network 232 may be any public or private data processing system network or combination of networks, as known to those of skill in the art, including the Internet. Data processing system 200 may communicate over network 232 to one or more computers, which are also not part of the data processing system 200, but may be implemented, for example, as a separate data processing system 200.

Embodiments of the present disclosure provide a hierarchical navigation of objects and related information for the objects to be grouped and displayed in a graphical user interface. The object groups may include groups for related graphics, properties, and other related types of information, such as schedules, trends, or reports that have reference to the selected item.

Figure 3:
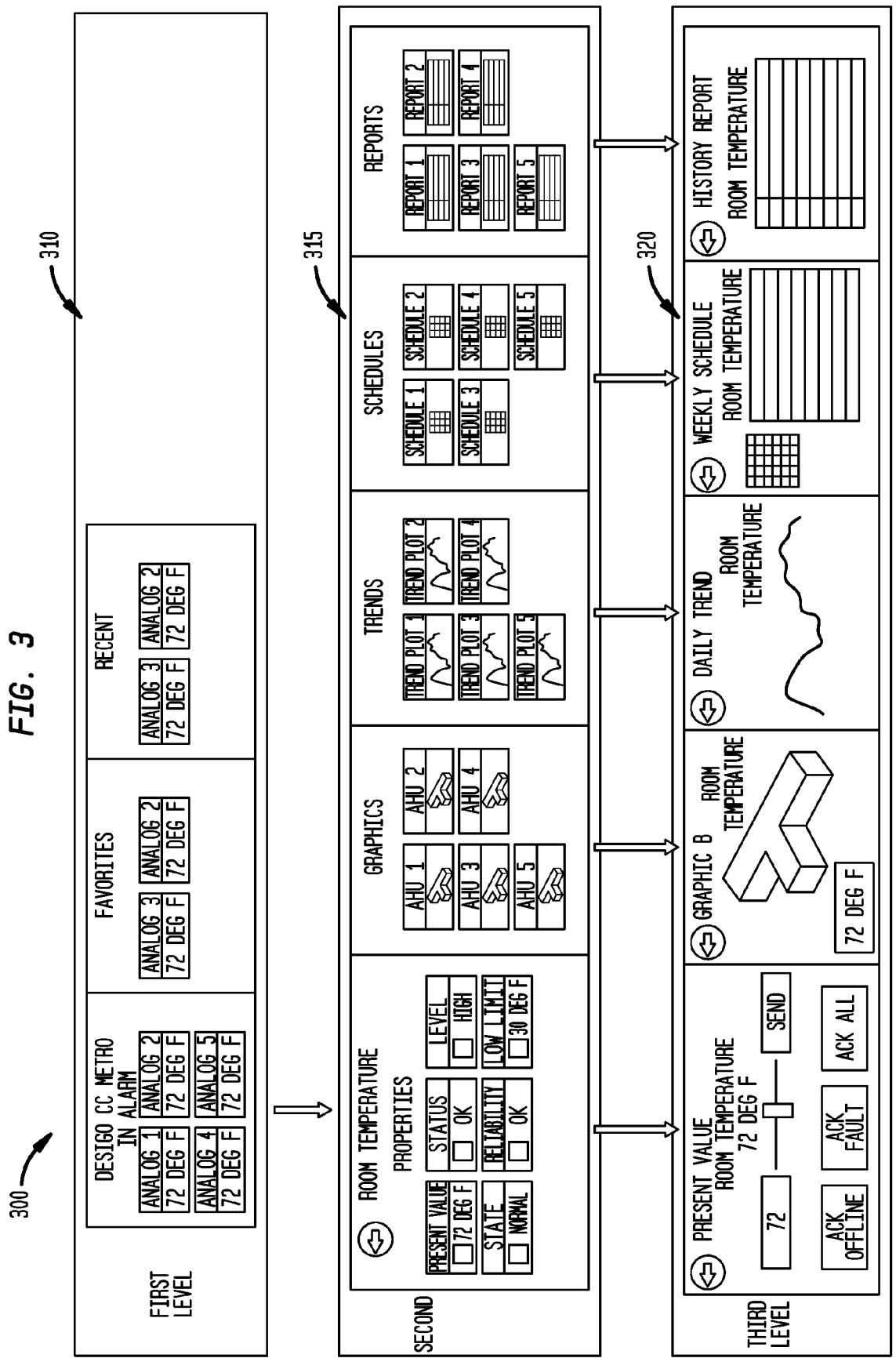
FIG. 3 illustrates an exemplary diagram of a hierarchical navigation structure including levels for hierarchical navigation of objects and related information in accordance with various embodiments of the present disclosure.

FIG. 3 illustrates an exemplary diagram of a hierarchical navigation structure 300 including levels 310-320 for hierarchical navigation of objects and related information in accordance with various embodiments of the present disclosure. As illustrated, the hierarchical navigation structure 300 includes a first level 310, a second level 315, and a third level 320. The hierarchical navigation structure 300 provides functionality for navigating between objects and data associated with a management system. The hierarchical navigation structure 300 allows for easy navigation among the various objects and related data allowing a user to monitor aspects of building management.

The first level 310 is a level that may be displayed when the navigation application 228 is initially launched. The first level 310 includes various objects. These objects may be organized into groups, such as, for example, objects that are in alarm, a user's favorite objects, and recently viewed or edited objects. Upon section of a tile of one of the objects in the first level 310, the tiles for the second level 315 may be displayed. The second level 315 displays tiles for objects related to the selected object. Upon section of a tile of one of the related objects in the second level 315, the tiles for the third level 320 may be displayed. The third level 320 displays detailed information related to the selected related object.

A user may navigate among the objects and information organized according to the levels in the hierarchical navigation structure 300. Using the hierarchical navigation structure 300 according to the present disclosure, the user is able to monitor and track information associated with building management in a manner that is intuitive and efficient. While FIG. 3 illustrates three levels in the hierarchical navigation structure 300, any number of different levels may be used in the in accordance with the principals of the present disclosure.

Figure 4:
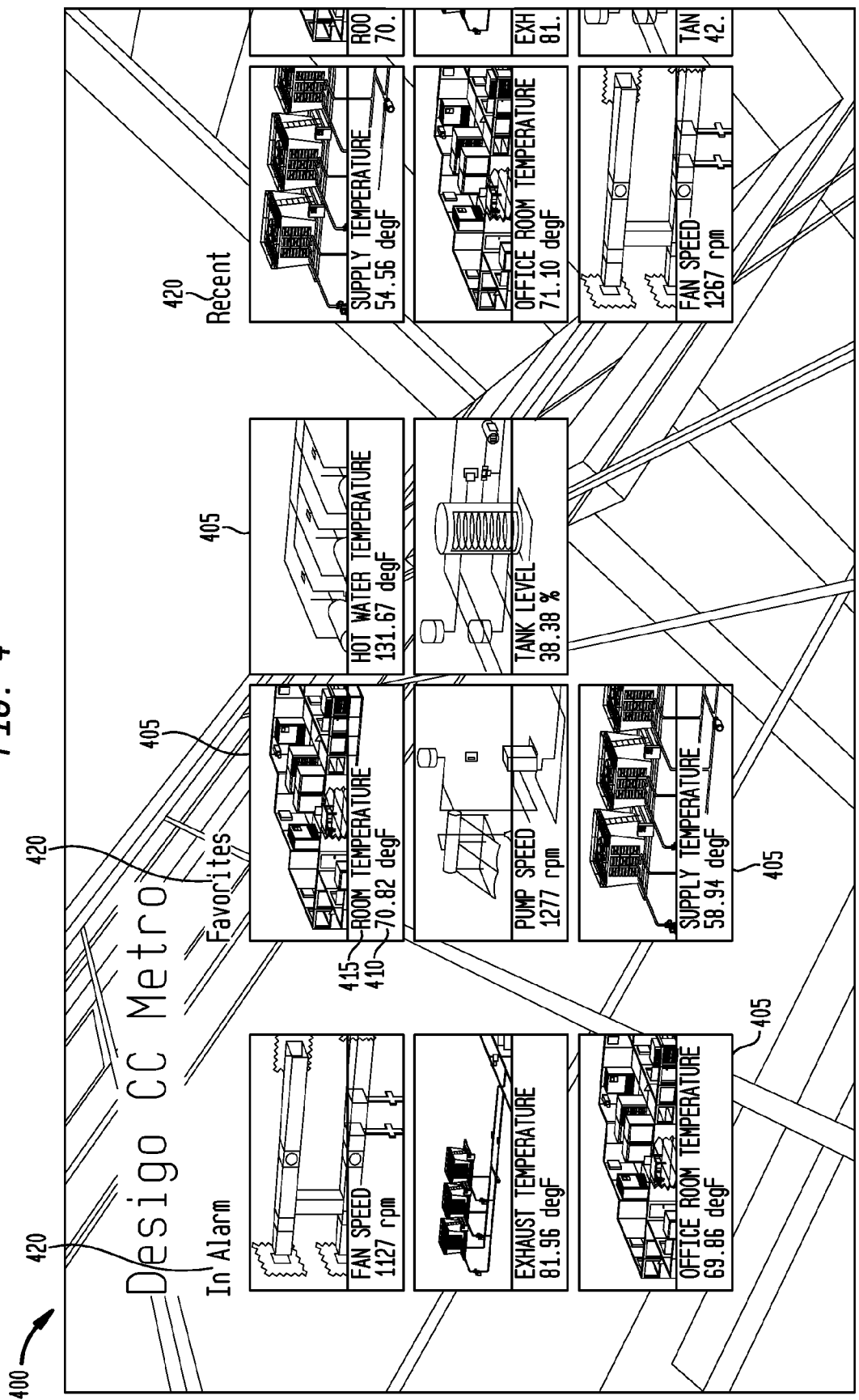
FIG. 4 illustrates an exemplary screen capture of a graphical user interface displaying tiles for objects grouped using the navigation application in accordance with disclosed embodiments.

FIG. 4 illustrates an exemplary screen capture of a graphical user interface 400 displaying tiles 405 for objects grouped using the navigation application 228 in accordance with disclosed embodiments. In this illustrative example, the graphical user interface 400 is a display of information that is generated by, for example, the data processing system 200 when a request to launch the navigation application is received. The graphical user interface 400 includes a display of tiles 405. Tiles 405 are selectable areas of a display that may include graphics and information that is dynamically updated. The navigation application 228 may receive this dynamically-updated information from a server application, such as, for example, the system manager application 122 running on the server data processing system 102. In this illustrative embodiment, the values 410 for the properties of the objects 415 may represent real-time data measured in the management system 100. For example, for the object 415 for "Room Temperature," the value 410 of "70.82° F." may be a value measured by a thermostat in the building automation devices 116 that is received by the server data processing system 102 and sent to the client data processing system 106b for display in the graphical user interface 400.

The display of object groups 420 in graphical user interface 400 represents an example of the first level 310 of the hierarchical navigation structure 300. For example, the graphical user interface 400 may display the tiles 405 for objects 415 in groups 420 upon the navigation application 126 being launched. In this first hierarchy level, the graphical user interface 400 displays the tiles 405 for the objects 415 in various groups as data hubs. In this example embodiment, these groups 420 include, but are not limited to, objects in alarm, favorite objects, and recently accessed objects. The objects in alarm may be included based on alarms reported by, for example, the reporting subsystem described above. A user may select, via configuration menu or user settings, objects that are to be included in the group for favorite objects. When the data processing system 200 receives a selection of one of the tiles 405, the data processing system 200 navigates the displayed content to a second level of the hierarchy.

Figure 5A:
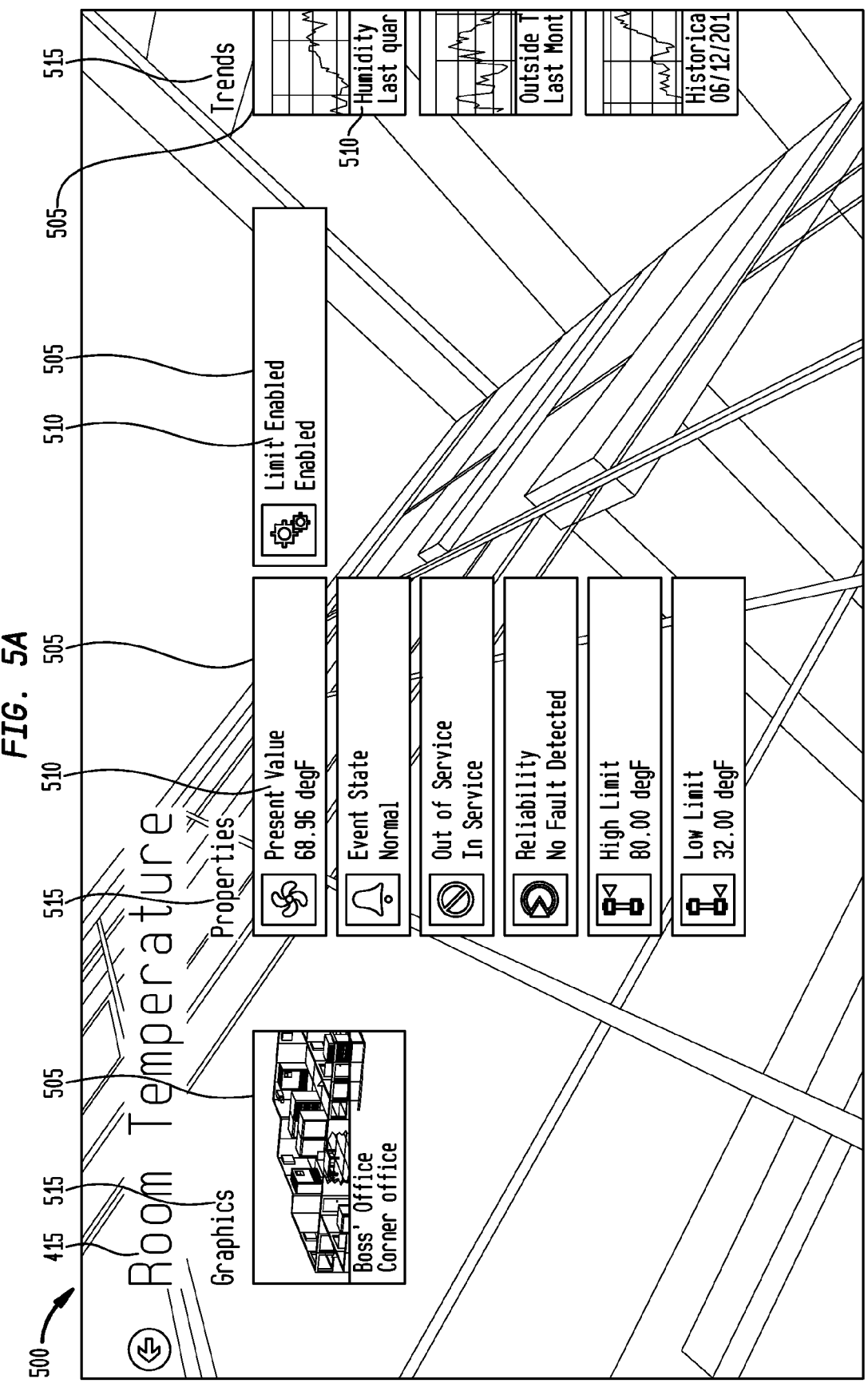
FIGS. 5A and 5B illustrate exemplary screen captures of the graphical user interface displaying tiles for related objects of an object selected using the navigation application in accordance with disclosed embodiments.
Figure 5B:
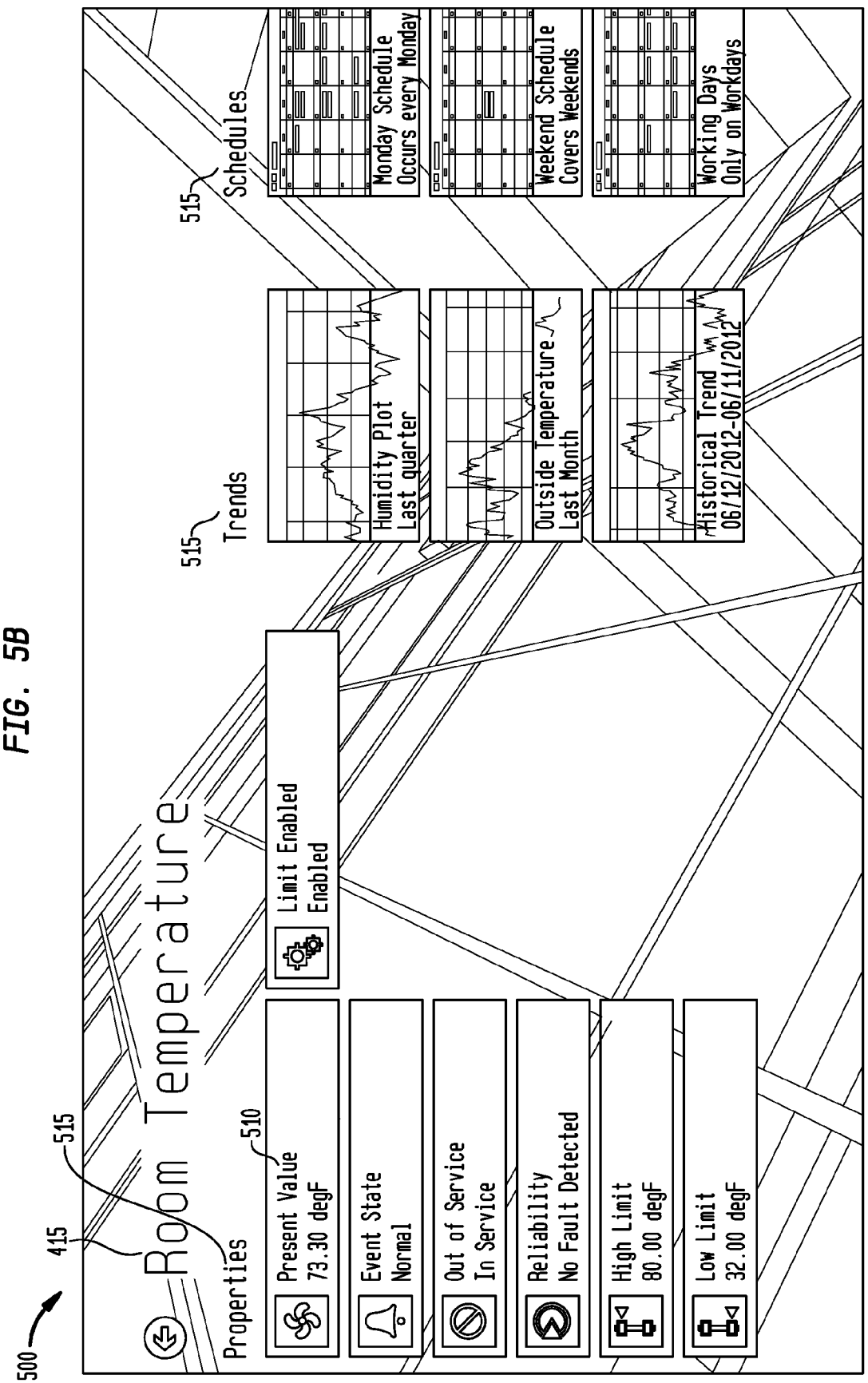

FIGS. 5A and 5B illustrate exemplary screen captures of the graphical user interface 500 displaying tiles 505 for related objects 510 of an object selected using the navigation application 228 in FIG. 2 in accordance with disclosed embodiments. In this illustrative example, the graphical user interface 500 is a display of information that is generated by, for example, the data processing system 200 when a tile for an object (e.g., the tile 405 for the object 415 for "Room Temperature") is selected by a user. For example, the display of related objects 510 in graphical user interface 500 may be an example of the second level 315 of the hierarchical navigation structure 300 of the navigation application 228.

When receiving a selection of an object, the data processing system 200 identifies and displays tiles 505 for related objects 510 that are related to the selected object. For example, the data processing system 200 may identify the related objects 510 based on a predetermined mapping of object relationships. The related objects 510 are any objects that either have a composite relationship with the selected object 415, such as properties of the object 415, or have any other type association or reference to the selected object 415, such as, for example, graphics, schedules, trends, or reports. These related objects 510 are grouped by type, such as, for example and without limitation, properties, graphics, trends, schedules, and reports, etc. The graphical user interface 500 displays the related objects 510 in groups 515. Additionally, these groups 515 may include children and/or parents of the selected object 415 defined in various physical or logical views or may include attributes of the selected object 415.

As the number of objects present in the management system 100 increases, so too does the number of objects that are related to an object. Thus, a large number of related objects may be displayable in the second level of the hierarchy. A user may scroll vertically or horizontally to view all the tiles 505 for all of the related objects 510. In various embodiments of the present disclosure, the navigation application 228 includes a semantic zoom feature that allows a user to activate a secondary display using a predefined user input. In this secondary display, the graphical user interface 500 may display a list of the groups 515 and the number of the related objects 510 that are in each group. Upon selection of a tile for one of the groups 515, the graphical user interface 500 may then scroll or "zoom" to the selected group 515, for example the group 515 for "Properties" as illustrated in FIG. 5B. For example, without limitation, the semantic zoom feature may be activated upon a two finger input into a touch screen, such as a pinch input.

The third level 320 of the hierarchical navigation structure 300 provided by the navigation application 228 includes detailed information for the selected object. For example, the data processing system 200 may receive a selection of one of the related objects 510 and generate a display including detailed information for that related object and access functionality appropriate to the type of object. Upon receipt of an input to go backwards, the data processing system may generate a display for a higher level in the hierarchical structure. The navigation application 228 also includes a search feature that allows a user to input the name of an object, and the data processing system 200 displays tile results for the object as letters for the name of the searched object are input. Upon selection of the tile of the searched object, the data processing system 200 may display the related objects of the searched object.

Figure 6A:
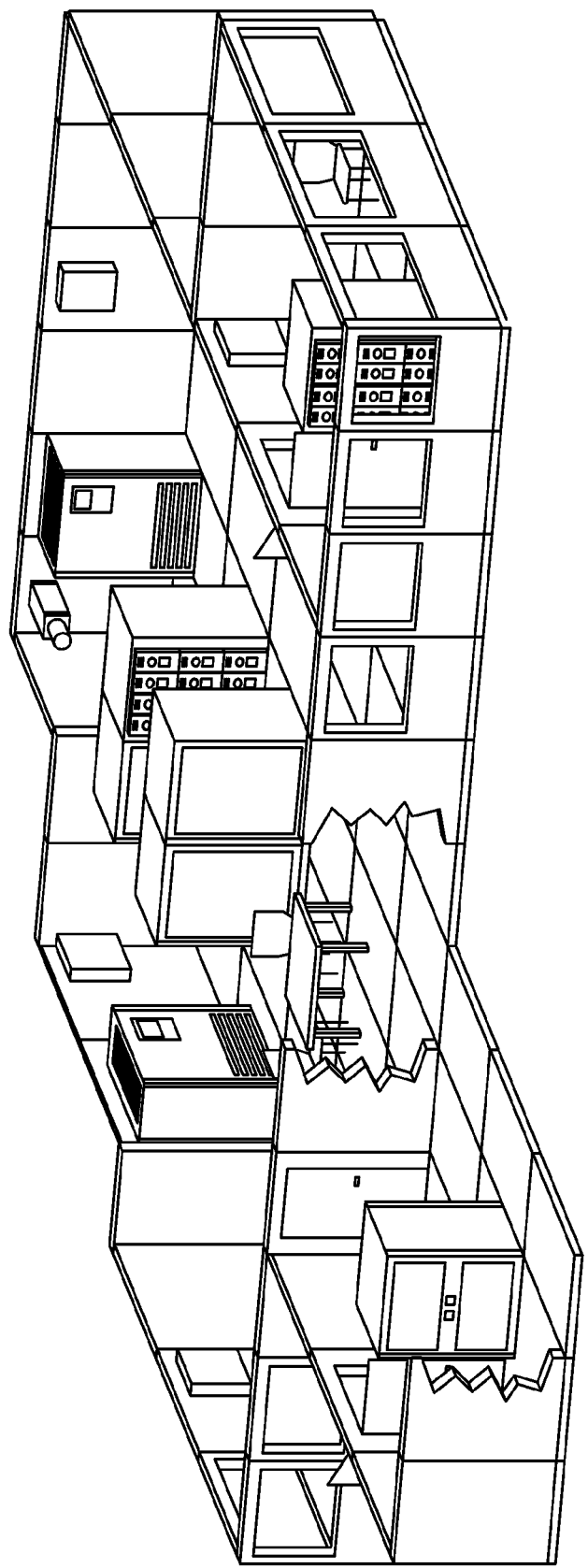
FIGS. 6A and 6B illustrate exemplary screen captures of the graphical user interface displaying building graphics for objects selected using the navigation application in accordance with disclosed embodiments.
Figure 6B:
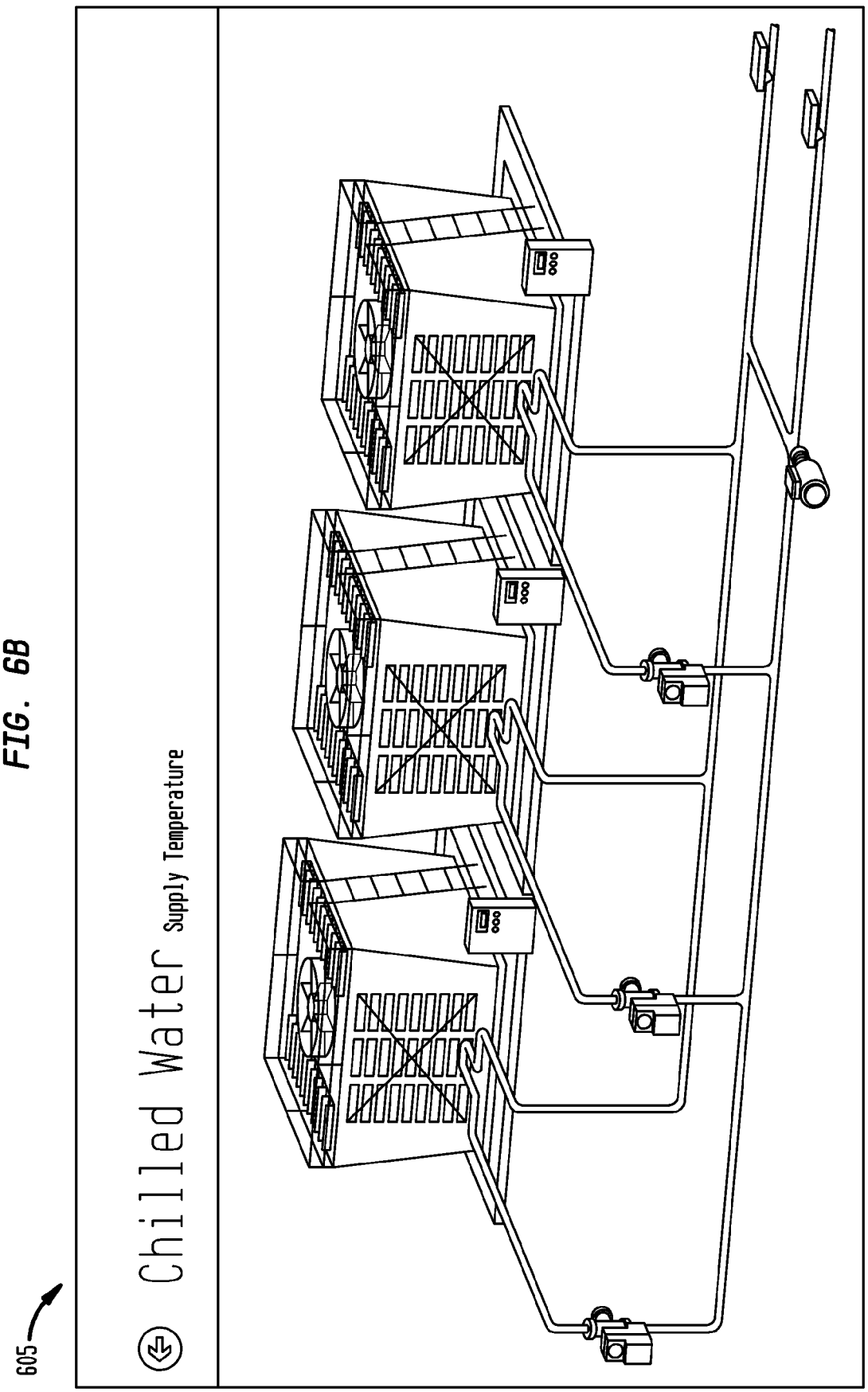

FIGS. 6A and 6B illustrate exemplary screen captures of the graphical user interface displaying building graphics for objects selected using the navigation application in accordance with disclosed embodiments. For example, the data processing system 200 may generate the graphical user interface 600 in FIG. 6A upon selection of a "Graphics" type of related object for an object for an "Air Handler." In another example, the data processing system 200 may generate the graphical user interface 605 in FIG. 6B upon selection of a "Graphics" type of related object for an object for "Chilled Water." The graphical user interfaces 600 and 605 provide users with a view of the environment that the selected objects operate in and may provide animations and graphical alerts (e.g., colors, flashing objects, etc.) as to the functional status of devices in the displayed environment.

Figure 7:
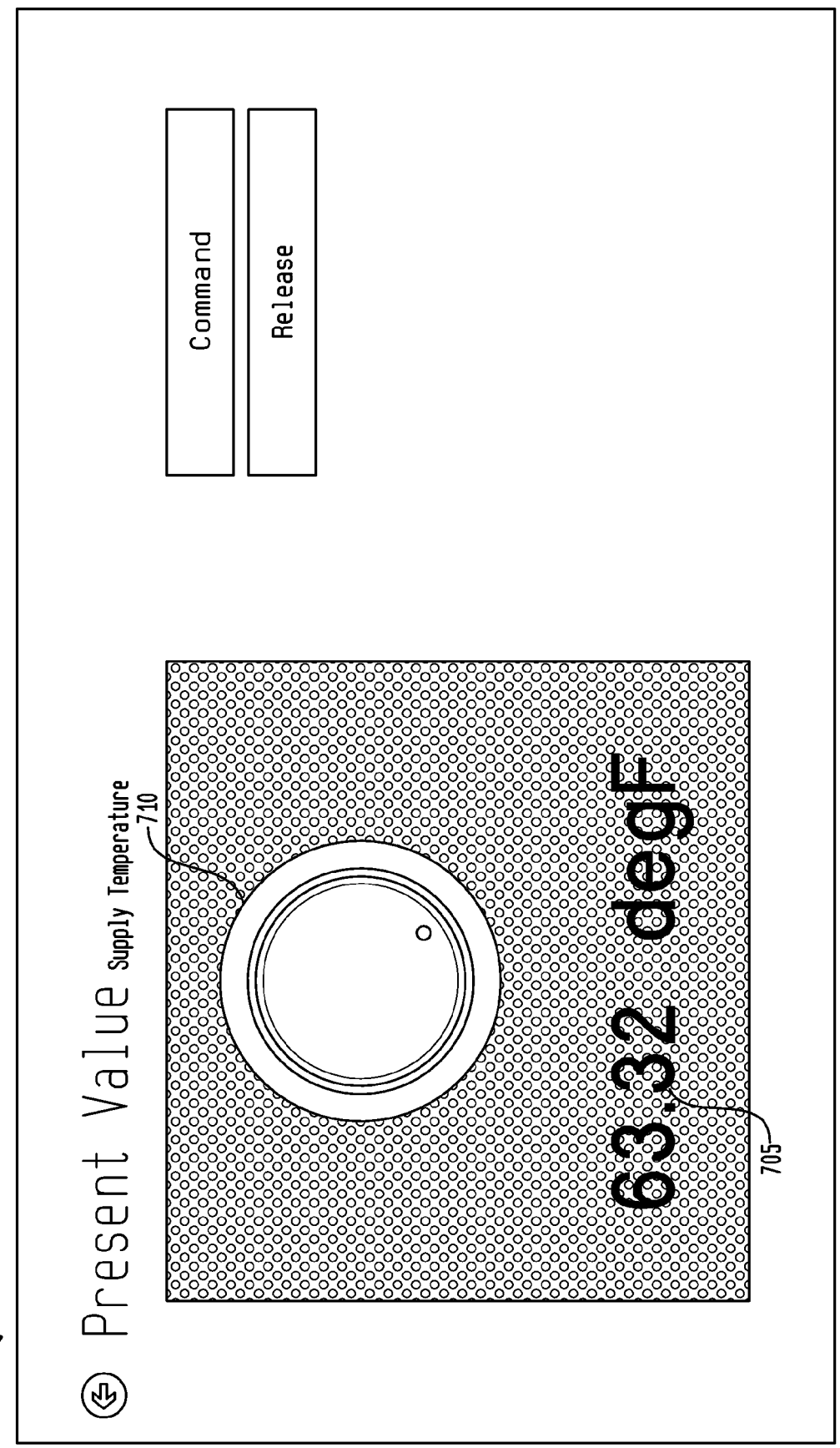
FIG. 7 illustrates an exemplary screen capture of the graphical user interface displaying a present value and a control graphic for a property of an object selected using the navigation application in accordance with disclosed embodiments.

FIG. 7 illustrates an exemplary screen capture of the graphical user interface 700 displaying a present value 705 and a control graphic 710 for a property of an object selected using the navigation application in accordance with disclosed embodiments. For example, the data processing system 200 may generate the graphical user interface 700 upon selection of a "Properties" type of related object for a property of "Present Value" for an object for "Supply Temperature." In this illustrative example, the graphical user interface 700 displays the value 705 for the temperature at 63.32° F. The graphical user interface 700 also displays a control graphic 710 for controlling the object. In this example, the control graphic 710 is an analog control that allows a user to change the value 705 for the temperature. Upon receipt of a user input for the changed value and a command to change the value, the data processing system 200 may send instructions to, for example, the building automation system 108 for the temperature to be changed.

FIG. 8 illustrates an exemplary screen capture of the graphical user interface displaying a report for data associated with an object selected using the navigation application in accordance with disclosed embodiments. For example, the data processing system 200 may generate the graphical user interface 800 upon selection of a "Reports" type of related object for "Active Events" for an object for "Supply Temperature". In this illustrative example, the graphical user interface 800 displays information about different events related to the object for "Supply Temperature". The graphical user interface 800 allows a user to review information about events, such as, for example, event categories, event causes, event status, event creation time, etc.

Figure 9:
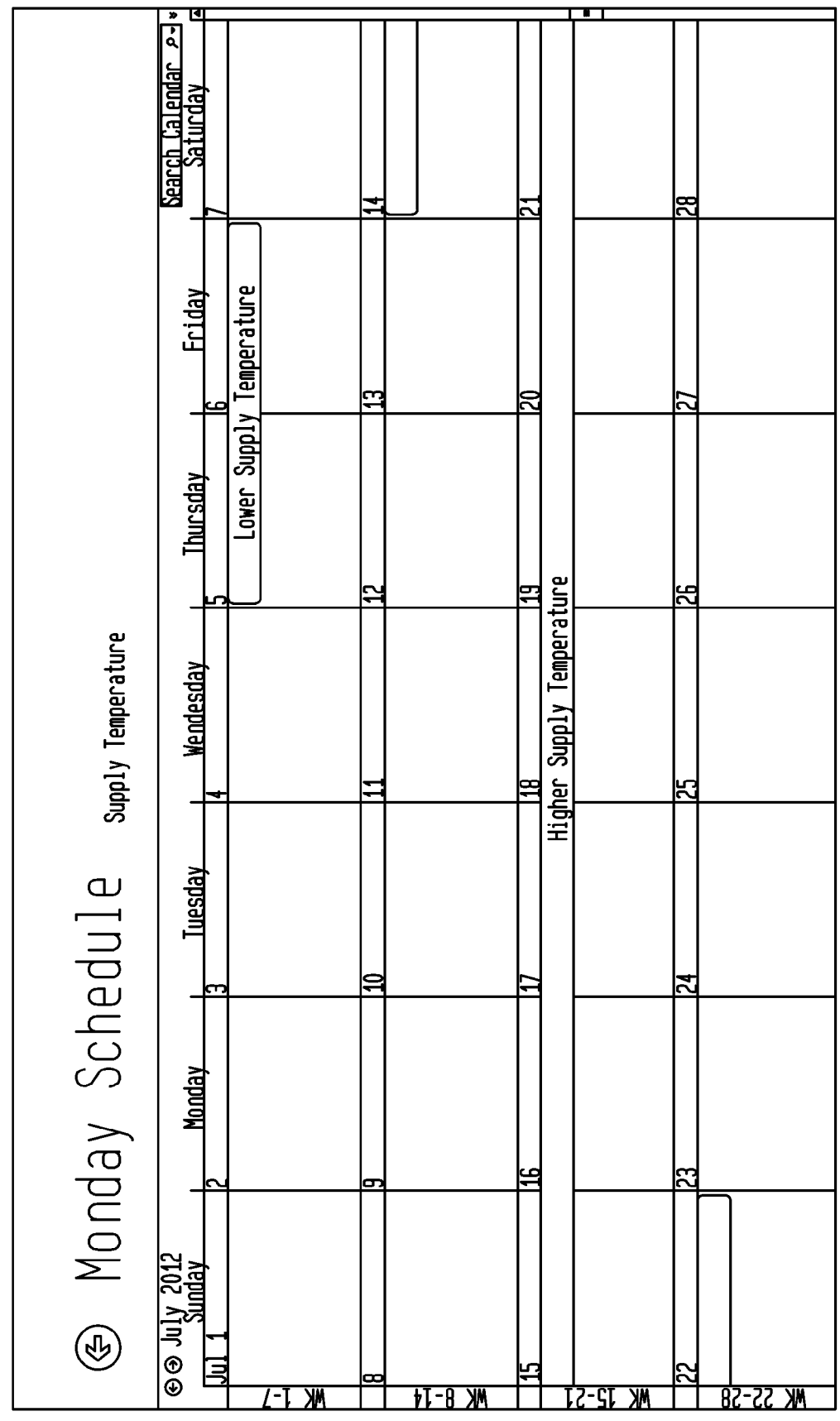
FIG. 9 illustrates an exemplary screen capture of the graphical user interface displaying a schedule of events for an object selected using the navigation application in accordance with disclosed embodiments.

FIG. 9 illustrates an exemplary screen capture of the graphical user interface displaying a schedule of events for an object selected using the navigation application in accordance with disclosed embodiments. For example, the data processing system 200 may generate the graphical user interface 900 upon selection of a "Schedule" type of related object for an object for "Supply Temperature". In this illustrative example, the graphical user interface 900 displays a calendar for scheduled events related to the object for "Supply Temperature". The graphical user interface 900 may allow a user to view, create, and modify schedules, reminders, and/or events related to the object for "Supply Temperature".

Figure 10:
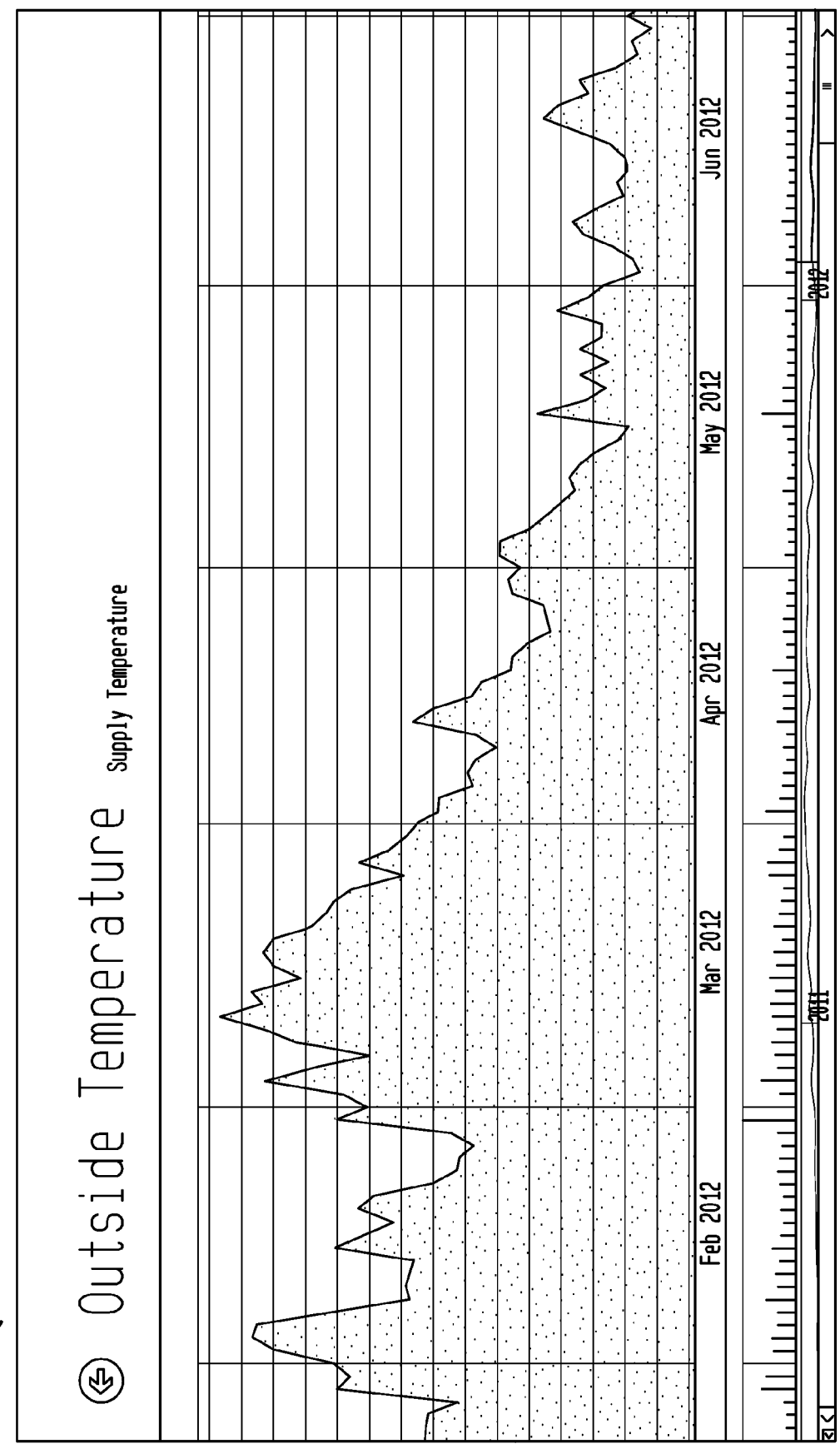
FIG. 10 illustrates an exemplary screen capture of the graphical user interface displaying a graph of a trend for data associated with an object selected using the navigation application in accordance with disclosed embodiments.

FIG. 10 illustrates an exemplary screen capture of the graphical user interface displaying a graph of a trend for data associated with an object selected using the navigation application in accordance with disclosed embodiments. For example, the data processing system 200 may generate the graphical user interface 1000 upon selection of a "Trends" type of related object for "Outside Temperature" for an object for "Supply Temperature". In this illustrative example, the graphical user interface 1000 displays a graph of measured values for outside temperature. The graphical user interface 1000 allows a user to review trend data that is related to or may have an effect on the related object for "Supply Temperature". The graphical user interface 1000 may also allow a user to change a trend definition for "Supply Temperature" or modify display properties determining how the trend data is presented in the graphical user interface 1000.

Figure 11:
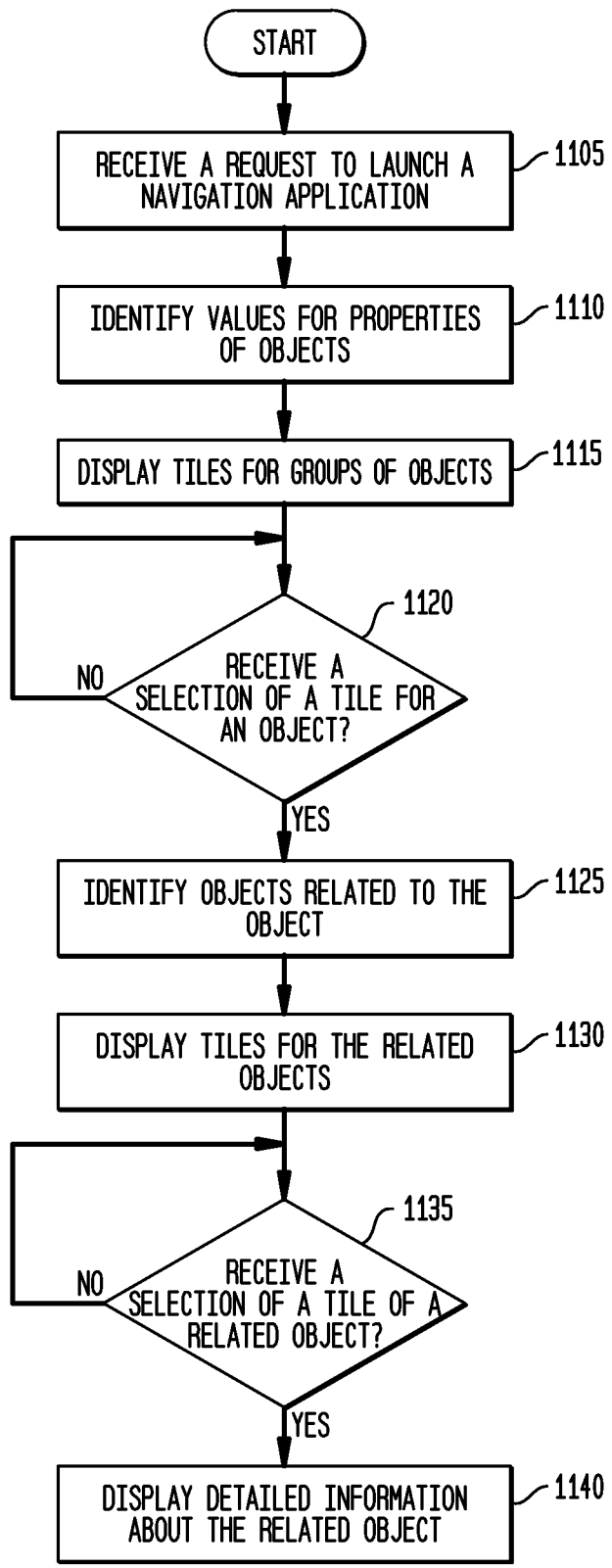
FIG. 11 illustrates a flowchart of a process for navigating information associated with a management system in accordance with disclosed embodiments.

FIG. 11 illustrates a flowchart of a process for navigating information associated with a management system in accordance with disclosed embodiments. This process may be performed, for example, in one or more data processing systems, such as, for example, the data processing system 200, configured to perform acts described below, referred to in the singular as "the system." The process may be implemented by executable instructions stored in a non-transitory computer-readable medium that cause one or more data processing systems to perform such a process. For example, the navigation application 228 may comprise the executable instructions to cause one or more data processing systems to perform such a process.

The process begins with the system receiving a request to launch a navigation application (step 1105). The system identifies values for properties of objects (step 1110). For example, in step 1110, the system may request and receive information about an object associated with one or more devices managed by the management system 110. The property for the object may be a current value that is dynamically updated as the value changes.

The system display tiles for groups of objects (step 1115). For example, in step 1115, the system may group objects and display the tiles according to object group as illustrated in the graphical user interface 400 in FIG. 4. The tiles may include display of a graphic for the object and the identified value for the property. For example, the groups for the objects may include objects in an alarm state, favorite objects, and recently accessed objects.

The system determines whether a selection of a tile for an object is received (step 1120). For example, in step 1120, the data processing system 200 may receive a user touch input via a touch screen. If the system receives the selection of the tile, the system identifies objects related to the object (step 1125). For example, in step 1125, the system may identify objects that include a reference to the object. The related objects may include graphics for object, properties for the object, trends for data associated with the object, schedules associated with the object, and reports for data associated with the object.

The system displays tiles for the related objects (step 1130). For example, in step 1130, the system may display the tiles for the related objects as illustrated in the graphical user interface 500 in FIG. 5A. The tiles for the related objects may include information for the related objects in the tiles, e.g., a present value, a graphic, a schedule, a trend graphic, etc.

The system determines whether a selection of a tile of a related object is received (step 1135). If the system receives the selection of the tile, the system displays detailed information about the related object (step 1140). For example, in step 1140, the system may display the detailed information as illustrated in the graphical user interfaces 600, 605, 700, 800, 900, and 1000 in FIGS. 6A, 6B, 7, 8, 9, and 10, respectively.

Disclosed embodiments provide a hierarchical navigation of objects and related information for the objects to be grouped and displayed in a graphical user interface. Embodiments of the present disclosure provide a hierarchal structure for the organization of related objects and associated data. The hierarchal structure of the present disclosure allows users to easily monitor and manage aspects of building automation and management.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of data processing system 200 may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke paragraph six of 35 USC §112 unless the exact words "means for" are followed by a participle.

What is claimed is:

1. A method in a data processing system for navigating information, the method comprising:
    identifying, using a processor of the data processing system, a value for a property of a first object associated with one or more devices managed by a management system;
    grouping a plurality of objects into first groups and displaying a first plurality of tiles for the plurality of objects according to the first groups, at least one of the displayed first groups of the first tiles including more than one of the displayed first tiles, the plurality of objects including the first object, a first tile in the first plurality of tiles being for the first object, the first tile including a display of a graphic associated with the first object and the identified value for the property;
    identifying a plurality of related objects that are related to the first object and displaying a second plurality of tiles for the related objects in response to receiving a selection of the first tile, wherein displaying the second plurality of tiles for the related objects comprises grouping the related objects into second groups based on object type and displaying the second plurality of tiles for the related objects according to the second groups, each of the second groups of the second tiles including a number of the second tiles and at least one of the displayed second groups of the second tiles including more than one of the displayed second tiles;

displaying, in response to receiving a selection of a second tile, in the second plurality of tiles, for one of the related objects, information about the one related object;

displaying, in response to receiving a predefined user input while displaying the second plurality of tiles for the related objects according to the second groups, third tiles for the second groups of the second tiles, each of the displayed third tiles representing a respective one of the second groups of the second tiles and including display of a numeral for the number of the second tiles in the respective group, the predefined user input being a different input than selection of a tile; and displaying, in response to receiving a selection of one of the third tiles for one of the second groups, the second tiles for the related objects that are in the one second group of the selected third tile.

2. The method of claim 1, wherein the information displayed about the one related object includes a control graphic for a device associated with the first object, the method further comprising:

sending an instruction to control an operation of the device in response to receiving a user input associated with the control graphic.

3. The method of claim 1, wherein the value for the property is a current value for the property received in response to a request to launch a navigation application associated with the management system.

4. The method of claim 1, wherein the related objects include one or more graphics associated with the first object, one or more properties for the first object, one or more trends for data associated with the first object, one or more schedules associated with the first object, and one or more reports for data associated with the first object.

5. The method of claim 1, wherein displaying the first plurality of tiles for the plurality of objects according to the first groups comprises:

organizing the plurality of objects into the first groups; and simultaneously displaying two tiles for a same object in different ones of the displayed first groups.

6. The method of claim 5, wherein the displayed first groups include objects in an alarm state, favorite objects, and recently accessed objects.

7. A data processing system configured to navigate information, the data processing system comprising:

a storage device comprising a navigation application;

an accessible memory comprising instructions of the navigation application; and a processor configured to execute the instructions of the navigation application to:

identify a value for a property of a first object associated with one or more devices managed by a management system;

group a plurality of objects into first groups and include a first plurality of tiles for a plurality of objects in a display according to the first groups, at least one of the displayed first groups of the first tiles including more than one of the displayed first tiles, the plurality of objects including the first object, a first tile in the first plurality of tiles being for the first object, the first tile including a display of a graphic associated with the first object and the identified value for the property;

identify a plurality of related objects that are related to the first object and include a second plurality of tiles for the related objects in a display in response to receiving a selection of the first tile for the first object, wherein to include the second plurality of tiles for the related objects in the display, the processor is further configured to execute the instructions of the navigation application to group the related objects into second groups based on object type and include the second plurality of tiles for the related objects in the display according to the second groups, each of the second groups including a number of the second tiles and at least one of the displayed second groups of the second tiles including more than one of the displayed second tiles;

include, in response to receiving a selection of a second tile, in the second plurality of tiles, for one of the related objects, information about the one related object in a display;

include, in response to receiving a predefined user input during display of the second plurality of tiles for the related objects according to the second groups, third tiles for the second groups of the second tiles in a display, each of the displayed third tiles representing a respective one of the second groups of the second tiles and including display of a numeral for the number of the second tiles in the respective group, the predefined user input being a different input than selection of a tile; and include, in response to receiving a selection of one of the third tiles for one of the second groups, the second tiles for the related objects that are in the one second group of the selected third tile in a display.

8. The data processing system of claim 7, wherein the information displayed about the one related object includes a control graphic for a device associated with the first object, wherein the processor is further configured to execute the instructions of the navigation application to:

send an instruction to control an operation of the device in response to receiving a user input associated with the control graphic.

9. The data processing system of claim 7, wherein the value for the property is a current value for the property received in response to a request to launch a navigation application associated with the management system.

10. The data processing system of claim 7, wherein the related objects include one or more graphics associated with the first object, one or more properties for the first object, one or more trends for data associated with the first object, one or more schedules associated with the first object, and one or more reports for data associated with the first object.

11. The data processing system of claim 7, wherein to include the first plurality of tiles for the plurality of objects associated with the management system in the display according to the first groups, the processor is further configured to execute the instructions of the navigation application to:

organize the plurality of objects into the first groups; and include two tiles for a same object in different ones of the first groups in a simultaneous display.

12. The data processing system of claim 11, wherein the displayed first groups include objects in an alarm state, favorite objects, and recently accessed objects.

13. A non-transitory computer-readable medium encoded with executable instructions that, when executed, cause one or more data processing systems to:

identify a value for a property of a first object associated with one or more devices managed by a management system;

group a plurality of objects into first groups and include a first plurality of tiles for a plurality of objects in a display according to the first groups, at least one of the displayed first groups of the first tiles including more than one of the displayed first tiles, the plurality of objects including the first object, a first tile in the first plurality of tiles being for the first object, the first tile including a display of a graphic associated with the first object and the identified value for the property;

identify a plurality of related objects that are related to the first object and include a second plurality of tiles for the related objects in a display in response to receiving a selection of the first tile for the first object, wherein the instructions that cause the one or more data processing systems to include the second plurality of tiles for the related objects in the display comprise instructions that, when executed, cause one or more data processing systems to group the related objects into second groups based on object type and include the second plurality of tiles for the related objects in the display according to the second groups, each of the second groups of the second tiles including a number of the second tiles and at least one of the displayed second groups of the second tiles including more than one of the displayed second tiles;

include, in response to receiving a selection of a second tile, in the second plurality of tiles, for one of the related objects, information about the one related object in a display;

include, in response to receiving a predefined user input during display of the second plurality of tiles for the related objects according to the second groups, third tiles for the second groups of the second tiles in a display, each of the displayed third tiles representing a respective one of the second groups of the second tiles and including display of a numeral for the number of the second tiles in the respective group, the predefined user input being a different input than selection of a tile; and include, in response to receiving a selection of one of the third tiles for one of the second groups, the second tiles for the related objects that are in the one second group of the selected third tile in a display.

14. The computer-readable medium of claim 13, wherein the information displayed about the one related object includes a control graphic for a device associated with the first object, wherein the computer-readable medium is further encoded with executable instructions that, when executed, cause one or more data processing systems to:

send an instruction to control an operation of the device in response to receiving a user input associated with the control graphic.

15. The computer-readable medium of claim 13, wherein the value for the property is a current value for the property received in response to a request to launch a navigation application associated with the management system.

16. The computer-readable medium of claim 13, wherein the related objects include one or more graphics associated with the first object, one or more properties for the object, one or more trends for data associated with the object, one or more schedules associated with the first object, and one or more reports for data associated with the first object.

17. The computer-readable medium of claim 13, wherein the instructions that cause the one or more data processing systems to include the first plurality of tiles for the plurality of objects associated with the management system in the display according to the first groups comprise instructions that, when executed, cause one or more data processing systems to:

organize the plurality of objects into the first groups of objects; and include two tiles for a same object in different ones of the first groups in a simultaneous display.

* * * * *